(12) United States Patent
Inoue et al.

(10) Patent No.: US 6,798,564 B2
(45) Date of Patent: Sep. 28, 2004

(54) RAMAN AMPLIFICATION METHOD, RAMAN AMPLIFIER, AND OPTICAL TRANSMISSION SYSTEM

(75) Inventors: Masayuki Inoue, Yokohama (JP); Masayuki Nishimura, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 42 days.

(21) Appl. No.: 10/254,839

(22) Filed: Sep. 26, 2002

(65) Prior Publication Data

US 2003/0063374 A1 Apr. 3, 2003

(30) Foreign Application Priority Data

Sep. 28, 2001 (JP) ..................................... P2001-302440

(51) Int. Cl.[7] .............................................. H01S 3/00
(52) U.S. Cl. .................................. 359/334; 359/341.3
(58) Field of Search .............................. 359/341.3, 334

(56) References Cited

U.S. PATENT DOCUMENTS 6,639,715 B2 * 10/2003 Naito et al. ................. 359/334

FOREIGN PATENT DOCUMENTS

| JP | 11-84440 | 3/1999 |
| JP | P2001-85773 A | 3/2001 |

OTHER PUBLICATIONS

OFC 2001 PD24–1, 2 and 3 (English).
OFC 2002 Tuesday, Mar. 19, pp. 116–117 (English).

* cited by examiner

*Primary Examiner*—Mark Hellner
(74) *Attorney, Agent, or Firm*—McDermott Will & Emery LLP

(57) ABSTRACT

The present invention relates to a Raman amplification method realizing Raman amplification of WDM signal light in a wider amplification wavelength band with a simpler configuration, and the like. A Raman amplifier realizing the Raman amplification method comprises a Raman amplification optical fiber, and a pumping light source for supplying pumping light having a wavelength $\lambda_p$ to the amplification optical fiber. In the Raman amplifier, a part of the signal light is Raman-amplified with the pumping light having the wavelength $\lambda_p$, whereas a part of the Raman-amplified light is utilized as pumping light. This Raman-amplifies signal light including a channel wavelength with a wavelength of $(\lambda_p+\Delta\lambda+20$ nm) or longer, where $\Delta\lambda$ is the Raman shift amount of wavelength caused by the pumping light at the wavelength $\lambda_p$.

23 Claims, 18 Drawing Sheets

| WAVELENGTH λ (nm) | OPTICAL POWER P (dBm) | | |
|---|---|---|---|
| FORWARD PUMPING LIGHT | 1422 | | 16.8 |
| 1382 | 27.5 | 1427 | 16.1 |
| 1387 | 17.2 | 1432 | 13.2 |
| 1392 | 22.4 | 1437 | 17.1 |
| 1397 | 23.0 | 1442 | 12.5 |
| 1402 | 15.6 | 1447 | 7.49 |
| 1407 | 19.0 | 1452 | 13.0 |
| 1412 | 18.9 | 1457 | 2.35 |
| 1417 | 13.5 | — | — |

| WAVELENGTH λ (nm) | OPTICAL POWER P (dBm) | | |
|---|---|---|---|
| FORWARD PUMPING LIGHT | | 1417 | 12.6 |
| 1382 | 24.4 | 1422 | 9.80 |
| 1387 | 10.6 | 1427 | 11.5 |
| 1392 | 18.9 | 1437 | 6.07 |
| 1397 | 13.4 | 1442 | 4.17 |
| 1407 | 13.1 | 1452 | 6.35 |
| 1412 | 12.4 | — | — |

| WAVELENGTH λ (nm) | OPTICAL POWER P (dBm) | | |
|---|---|---|---|
| FORWARD PUMPING LIGHT | | 1427 | 16.3 |
| 1387 | 23.2 | 1437 | 12.9 |
| BACKWARD PUMPING LIGHT | | 1447 | 13.1 |
| 1397 | 20.3 | 1457 | 11.6 |
| 1407 | 18.9 | 1467 | 7.26 |
| 1417 | 19.6 | 1477 | 6.29 |

INPUT SIGNAL LIGHT 1480~1630nm -1dBm/ch → 20:HNL10km → OUTPUT SIGNAL LIGHT 4dBm/ch ← BACKWARD PUMPING LIGHT

| WAVELENGTH λ (nm) | OPTICAL POWER P (dBm) | | |
|---|---|---|---|
| BACKWARD PUMPING LIGHT | | 1425 | 15.3 |
| 1385 | 23.6 | 1435 | 11.1 |
| 1395 | 21.0 | 1445 | 9.79 |
| 1405 | 17.1 | 1455 | 7.74 |
| 1415 | 17.5 | 1475 | 3.66 |

| WAVELENGTH λ (nm) | OPTICAL POWER P (dBm) | | |
|---|---|---|---|
| FORWARD PUMPING LIGHT | | BACKWARD PUMPING LIGHT | |
| 1382 | 22.3 | 1432 | 19.1 |
| 1392 | 21.7 | 1442 | 16.5 |
| 1402 | 20.5 | 1452 | 15.3 |
| 1412 | 18.9 | 1462 | 11.2 |
| 1422 | 15.8 | — | — |

Fig.25

| WAVELENGTH λ (nm) | OPTICAL POWER P (dBm) | | |
|---|---|---|---|
| FORWARD PUMPING LIGHT | | 1425 | 16.7 |
| 1385 | 21.8 | 1435 | 11.3 |
| BACKWARD PUMPING LIGHT | | 1445 | 11.0 |
| 1395 | 20.6 | 1455 | 11.4 |
| 1405 | 18.6 | 1465 | 7.00 |
| 1415 | 18.2 | 1475 | 7.01 |

| WAVELENGTH λ (nm) | OPTICAL POWER P (dBm) | | |
|---|---|---|---|
| FORWARD PUMPING LIGHT | | BACKWARD PUMPING LIGHT | |
| 1350 | 23.0 | 1400 | 20.1 |
| 1360 | 21.3 | 1410 | 18.8 |
| 1370 | 19.3 | 1420 | 16.6 |
| 1380 | 18.4 | 1430 | 15.6 |
| 1390 | 15.6 | — | — |

| WAVELENGTH λ (nm) | OPTICAL POWER P (dBm) | | |
|---|---|---|---|
| FORWARD PUMPING LIGHT | | 1390 | 18.6 |
| 1350 | 27.9 | 1400 | 16.0 |
| BACKWARD PUMPING LIGHT | | 1410 | 17.3 |
| 1360 | 16.3 | 1420 | 13.5 |
| 1380 | 20.2 | 1430 | 10.3 |

RAMAN AMPLIFICATION METHOD, RAMAN AMPLIFIER, AND OPTICAL TRANSMISSION SYSTEM

BACKGROUND OF THE INVENTION

1. Field of the Invention

The present invention relates to a Raman amplification method, a Raman amplifier, and an optical transmission system which Raman-amplify a plurality of channels of signal light having wavelengths different from each other.

2. Related Background Art

Optical fiber amplifiers are optical devices which amplify signal light propagating through optical fiber transmission lines in optical transmission systems, in order to compensate for the transmission loss in the optical transmission lines. An optical fiber amplifier placed on an optical transmission line comprises an amplification optical fiber also functioning as an optical transmission line, and pumping light supply means for supplying pumping light to the amplification optical fiber. When fed into an amplification optical fiber supplied with pumping light, signal light is amplified in the amplification optical fiber.

Known as such an optical fiber amplifier are rare-earth-doped fiber amplifiers doped with rare earth elements such as Er (erbium), and Raman amplifiers utilizing Raman amplification phenomena caused by stimulated Raman scattering.

Here, the rare-earth-doped fiber amplifiers (e.g., EDFA: Erbium-Doped Fiber Amplifier) utilize an optical fiber doped with a rare earth element (e.g., EDF: Erbium-Doped Fiber) as an amplification optical fiber. On the other hand, the Raman amplifiers utilize a silica-type optical fiber constituting optical fiber transmission lines and the like as a Raman amplification optical fiber.

In the above-mentioned optical amplifiers, the Raman amplifiers are advantageous in that they can use a given wavelength band as an amplification wavelength band by choosing an appropriate wavelength of pumping light. If a plurality of pumping light sources respectively supplying different wavelengths of pumping light to a Raman amplification optical fiber are prepared, signal light can be amplified while using respective wavelength bands determined by the individual channel wavelengths included in the pumping light as amplification wavelength bands.

SUMMARY OF THE INVENTION

The inventors studied conventional techniques and, as a result, have found the following problems. Recently, due to social needs at the advent of highly information-oriented society, studies and developments concerning large-capacity, high-speed communications and long-haul communications have vigorously been under way. Here, a wavelength division multiplexing (WDM) transmission system carries out high-speed/large-capacity optical communications by transmitting a plurality of channels of signal light having wavelengths different from each other through an optical fiber transmission line. Also, for further increasing the capacity, the signal wavelength band of WDM signal light has been in the process of widening in the WDM transmission system.

When amplifying WDM signal light in such a WDM transmission system, it is necessary for its amplification wavelength band to become wider. In the above-mentioned Raman amplifiers, on the other hand, the amplification wavelength band obtained by a predetermined wavelength of pumping light is limited. Also, as the amplification wavelength band widens, it has been becoming difficult for an amplification wavelength band enhancing method such as one increasing the number of pumping light sources to sufficiently respond to the widening of the amplification wavelength band.

Examples of other methods proposed therefor include one comprising the steps of dividing the signal wavelength band of WDM signal light into a plurality of wavelength bands and amplifying WDM signal light in each of thus divided wavelength bands, and one amplifying WDM signal light by combining a Raman amplifier and a rare-earth-doped fiber amplifier (see, for example, Japanese Patent Application Laid-Open No. 2001-085773, Japanese Patent Application Laid-Open No. HEI 11-084440, and OFC2001, PD-24). In these methods, however, the configuration of the optical transmission system becomes complicated as a whole, thereby increasing the cost. Also, they have not fully realized signal amplification throughout the signal wavelength band.

In order to overcome the problems mentioned above, it is an object of the present invention to provide a Raman amplification method enabling Raman amplification of WDM signal light in a simpler configuration over a wider amplification wavelength band, a Raman amplifier realizing the Raman amplification method, and an optical transmission system including the Raman amplifier.

The Raman amplification method according to the present invention Raman-amplifies a plurality of channels of signal light (WDM signal light) having wavelengths different from each other. In particular, for achieving the above-mentioned object, the Raman amplification method according to the present invention Raman-amplifies a part of the WDM signal light by supplying pumping light having a wavelength $\lambda_p$ to an amplification optical fiber through which the WDM signal light propagates, and utilizes at least a part of the Raman-amplified light (part of the WDM signal light) as pumping light, so as to Raman-amplify a part of WDM signal light including a channel wavelength with a wavelength of $(\lambda_p+\Delta\lambda+20\text{ nm})$ or longer, where $\Delta\lambda$ is the Raman shift amount of wavelength caused by the pumping light at the wavelength $\lambda_p$.

The Raman amplifier according to the present invention Raman-amplifies a plurality of channels of signal light (WDM signal light) having wavelengths different from each other. The Raman amplifier comprises a Raman amplification optical fiber, pumping light supply means, and multiplexing means. The pumping light supply means supplies pumping light having a wavelength $\lambda_p$ to the Raman amplification optical fiber. The multiplexing means guides to the Raman amplification optical fiber the pumping light from the pumping light supply means. The Raman amplification optical fiber transmits the WDM signal light therethrough, whereas pumping light having a wavelength $\lambda_p$ for Raman-amplifying at least a part of the WDM signal light is supplied there to by way of the multiplexing means. In particular, the Raman amplifier utilizes at least a part of the light Raman-amplified by the pumping light having the wavelength $\lambda_p$ as pumping light, thereby Raman-amplifying a part of WDM signal light including a channel wavelength with a wavelength of $(\lambda_p+\Delta\lambda+20\text{ nm})$ or longer, where $\Delta\lambda$ is the Raman shift amount of wavelength caused by the pumping light at the wavelength $\lambda_p$.

For WDM signal light in a wider signal wavelength band, the above-mentioned Raman amplification method and Raman amplifier carry out Raman amplification utilizing pumping light having a wavelength $\lambda_p$, and Raman amplification utilizing a part of the WDM signal light as pumping light. This Raman-amplifies a part of WDM signal light including a channel wavelength with a wavelength of ($\lambda_p$+ $\Delta\lambda$+20 nm) or longer, thus being able to Raman-amplify WDM signal light over a wider amplification wavelength band. Also, since it is not necessary for the WDM signal light to be divided into a plurality of wavelength bands and amplified in each wavelength band, the configuration and the like as an optical amplifier are simplified.

Specifically, it is preferred that the wavelength $\lambda_p$ of pumping light in the Raman amplification method (Raman amplifier) be set so as to Raman-amplify at least first signal light including a signal channel within a first wavelength band located on the shorter wavelength side of an amplification wavelength band. On the other hand, it is preferred that the Raman-amplified first signal light be utilized as pumping light so as to Raman-amplify second signal light including a signal channel within a second wavelength band located on the longer wavelength side than is the first wavelength band. As a consequence, the whole signal wavelength band is included in a wavelength band which can be amplified (amplification wavelength band), whereby signal light can be amplified reliably and fully.

The pumping light supply means may supply a plurality of channels of pumping light having wavelengths different from each other to the amplification optical fiber as pumping light. This, together with the above-mentioned configuration for causing a part of the signal channel to function as a pumping channel, makes it possible to further widen the amplification wavelength band that can be Raman-amplified.

The pumping light traveling direction in the amplification optical fiber may be the same as the signal traveling direction. Such a copropagation-pumping configuration secures a sufficient Raman amplification gain throughout the amplification wavelength band. The pumping light traveling direction in the amplification optical fiber may be opposite from the signal traveling direction. Such a counterpropagation-pumping configuration effectively restrains signals from deteriorating due to nonlinear phenomena in the amplification optical fiber. Also, the pumping light supplied to the amplification optical fiber may include forward pumping light whose traveling direction in the amplification optical fiber is the same as the signal light traveling direction, and backward pumping light whose traveling direction in the amplification optical fiber is opposite from the signal light traveling direction. Such a bidirectional pump configuration not only secures a sufficient Raman amplification gain, but also effectively restrains signals from deteriorating due to nonlinear phenomena. The foregoing configurations of Raman amplifier are set in view of specific conditions such as signal wavelength bands of WDM signal light.

Preferably, in the Raman amplifier according to the present invention, the amplification optical fiber includes a unitary optical fiber capable of Raman-amplifying signal light. This makes the structure of the optical amplifier simpler than that in the configuration also using amplification effected by a rare-earth-doped optical fiber and the like.

The optical transmission system according to the present invention comprises an optical fiber transmission line through which a plurality of channels of signal light (WDM signal light) having wavelengths different from each other propagates; and a Raman amplifier, placed at a predetermined position on the optical fiber transmission line, having the configuration mentioned above (Raman amplifier according to the present invention). This configuration yields an optical transmission system which, even when transmitting WDM signal light in a wider signal wavelength band, can fully Raman-amplify each signal channel of the WDM signal light, thereby enabling favorable optical transmission.

In the optical transmission system, the amplification optical fiber of the Raman amplifier may include an optical fiber provided separately from the optical fiber transmission line. In this case, the Raman amplifier becomes a lumped optical amplifier. Alternatively, the amplification optical fiber of the Raman amplifier may constitute a part of the optical fiber transmission line. In this case, the Raman amplifier becomes a distributed constant optical amplifier.

The optical transmission system may comprise a first Raman amplifier (lumped Raman amplifier) having a configuration similar to that of the above-mentioned Raman amplifier (optical amplifier according to the present invention), whose amplification optical fiber is an optical fiber provided separately from the optical fiber transmission line, and a second Raman amplifier (distributed constant Raman amplifier) having a configuration similar to that of the above-mentioned Raman amplifier (Raman amplifier according to the present invention), whose amplification optical fiber is an optical fiber constituting a part of the optical fiber transmission line.

Preferably, in the optical transmission system, a predetermined signal channel in the signal channels included in the WDM signal light has a signal light power higher than the input signal light power to the optical fiber transmission line in a predetermined segment of the optical fiber transmission line. This fully Raman-amplifies the signal light throughout a wider amplification wavelength band. The input signal light power to the optical fiber transmission line may be the same among the individual signal channels of WDM signal light. This facilitates power control of each signal channel in the optical transmission system. When a channel functioning as a pumping channel in the channels included in WDM signal light is not utilized as a signal channel, the optical transmission system transmits dummy signal light having the same wavelength as that of the unutilized channel. This enables stable Raman amplification throughout the amplification wavelength band regardless of the transmission state of WDM signal light (the state of use of each signal channel in the WDM signal). Preferably, in the optical transmission system, signal channels included in the WDM signal light are successively used in order of elongating wavelength. This can favorably widen the amplification wavelength band effected by Raman amplification.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 25 is a table for explaining pumping light supplied to a highly nonlinear fiber in the fifth example of Raman amplification;

DETAILED DESCRIPTION OF THE PREFERRED EMBODIMENTS

Figure 1:
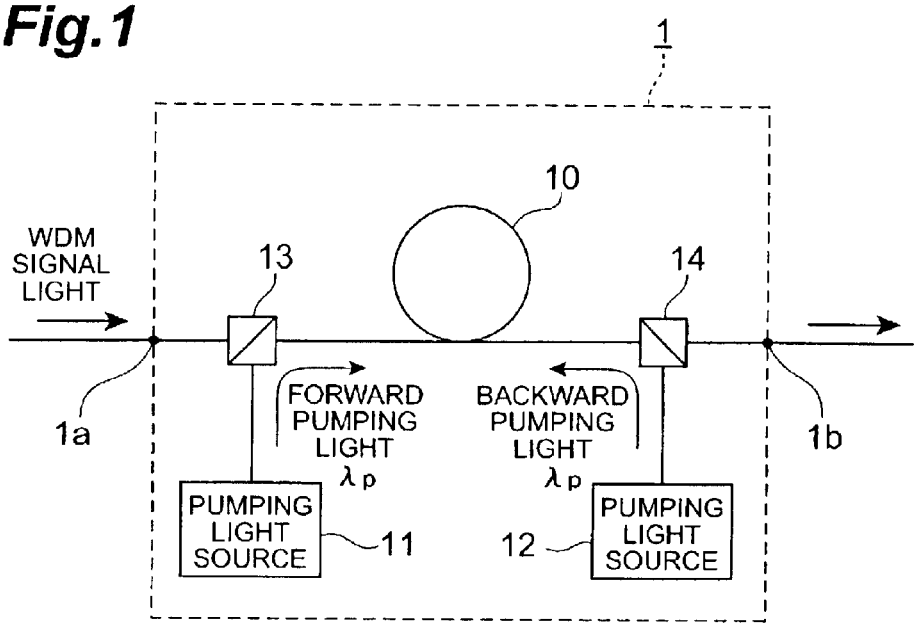
FIG. 1 is a view showing the configuration of an embodiment of the Raman amplifier according to the present invention.

In the following, embodiments of the Raman amplification method, Raman amplifier, and optical transmission system according to the present invention will be explained in detail with reference to FIGS. 1 to 31. In the explanation of the drawings, constituents identical to each other will be referred to with numerals or letters identical to each other without repeating their overlapping descriptions. Proportions of dimensions in the drawings do not always match those explained.

FIG. 1 is a view showing the configuration of an example of the Raman amplifier according to the present invention. In an optical transmission system such as a WDM transmission system through which a plurality of channels of signal light (WDM signals) having wavelengths different from each other propagates, this Raman amplifier 1 is employed as an optical amplifier for amplifying the WDM signal light within a predetermined signal wavelength band.

The Raman amplifier 1 of FIG. 1 comprises an amplification optical fiber 10, and two pumping light sources 11, 12. The amplification optical fiber 10 is an optical transmission line through which the WDM signal light propagates from the input end 1a to output end 1b of the Raman amplifier 1, and also functions as a Raman amplification optical fiber for Raman-amplifying the WDM signal light with pumping light having a wavelength $\lambda_p$.

The pumping light having the wavelength $\lambda_p$ is supplied to the amplification optical fiber 10 by the two pumping light sources 11, 12 included in pumping light supply means. The pumping light source 11 is a pumping light source for copropagation-pumping (forward pumping). The pumping light source 12 is a pumping light source for counterpropagation-pumping (backward pumping).

The pumping light source 11 is optically coupled to the optical transmission line within the Raman amplifier 1 by way of the optical multiplexer 13 disposed as multiplexing means between the input end 1a and the amplification optical fiber 10. On the other hand, the pumping light source 12 is optically coupled to the optical transmission line within the Raman amplifier 1 by way of the optical multiplexer 14 disposed as multiplexing means between the output end 1b and the amplification optical fiber 10.

The optical multiplexer 13 transmits therethrough to the amplification optical fiber 10 the WDM signal light having arrived from the input end 1a, and forwardly transmits therethrough to the amplification optical fiber 10 the pumping light having the wavelength $\lambda_p$ supplied from the pumping light source 11. On the other hand, the optical multiplexer 14 transmits therethrough to the output end 1b the WDM signal light having arrived from the amplification optical fiber 10, and backwardly transmits therethrough to the amplification optical fiber 10 the pumping light supplied from the pumping light source 12. Thus, the Raman amplifier 1 is constructed as a bidirectional pumping optical amplifier.

By using a Raman amplification method causing a part of WDM signal light having a wider signal wavelength band to function as pumping light, the Raman amplifier 1 Raman-amplifies all the signal channels included in the WDM signal light. Namely, the Raman amplifier 1 of FIG. 1 carries out Raman amplification by supplying the pumping light having the wavelength $\lambda_p$ to the WDM signal light, and utilizes at least a part of thus Raman-amplified light (part of the WDM signal light) as pumping light for the other signal channels that are not Raman-amplified.

This makes it possible to Raman-amplify signal light including a channel wavelength with a wavelength of $(\lambda_p+\Delta\lambda+20$ nm) or longer, where $\Delta\lambda$ is the Raman shift amount of wavelength caused by the pumping light at the wavelength $\lambda_p$. Here, the wavelength band including the individual channel wavelengths of newly Raman-amplified signals is contained in the amplification wavelength band of the Raman amplifier 1, whereby the amplification wavelength band in the Raman amplifier 1 can be widened to the longer wavelength side.

In such a Raman amplification method, for example, the wavelength $\lambda_p$ of pumping light supplied from the pumping light sources 11, 12 is set to a wavelength which can Raman-amplify at least first signal light including a signal channel within a first wavelength band located on the shorter wavelength side of the amplification wavelength band. On the other hand, the first signal light Raman-amplified by the pumping light from the pumping light sources 11, 12 is caused to function as pumping light, so as to Raman-amplify second signal light including a signal channel within a second wavelength band located on the longer wavelength side than is the first wavelength band of the amplification wavelength band. Employing such a configuration and Raman amplification method makes it possible to Raman-amplify signal light reliably and sufficiently within the amplification wavelength band including the whole signal wavelength band to be Raman-amplified.

Figure 2:
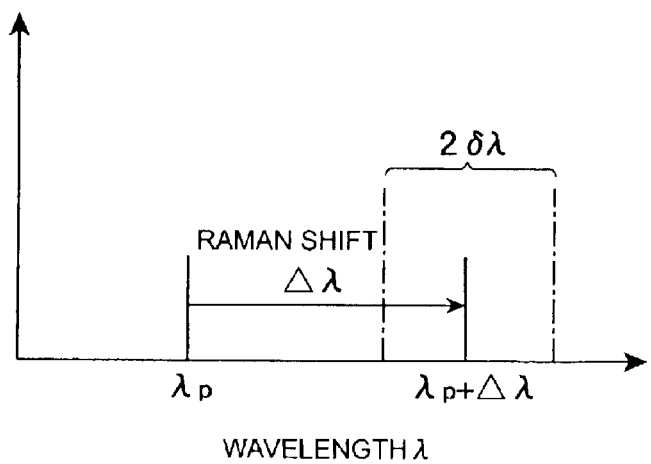
FIG. 2 is a graph for explaining the Raman amplification method in the Raman amplifier of FIG. 1 (Raman amplification method according to the present invention)

The above-mentioned Raman amplification method (Raman amplification method according to the present invention) realized in the Raman amplifier 1 will now be explained specifically with reference to the graph shown in FIG. 2.

First, for simplification, Raman amplification utilizing only one channel of pumping light will be considered. When pumping light having a wavelength $\lambda_p$ is supplied in optical amplification (Raman amplification) utilizing a Raman amplification phenomenon caused by stimulated Raman scattering, the peak wavelength of Raman amplification gain is located at a wavelength of $(\lambda_p+\Delta\lambda)$ shifted to the longer wavelength by a Raman shift amount $\Delta\lambda$ as shown in FIG. 2. Then, a predetermined wavelength range centered at this gain peak wavelength $(\lambda_p+\Delta\lambda)$ becomes an amplification wavelength band effected by Raman amplification.

Specifically, in signal light in a wavelength band usually used for an optical transmission system (e.g., signal light in the 1.55-$\mu$m band), the Raman shift caused by a Raman amplification phenomenon is about 440 cm$^{-1}$. Its corresponding wavelength-converted Raman shift amount is approximately $\Delta\lambda$ to 100 nm.

With respect to the maximum gain of Raman amplification at the gain peak wavelength $(\lambda_p+\Delta\lambda)$ shifted from the wavelength $\lambda_p$ of the pumping light, the gain at a wavelength separated from the gain peak wavelength by a wavelength $\delta\lambda$ ($=\pm 15$ to $\pm 20$ nm) is about one half. As a consequence, the wavelength bandwidth of the effective amplification wavelength band caused by Raman amplification becomes a bandwidth $2\delta\lambda$ ($=35$ to $40$ nm) per channel of pumping light (see Japanese Patent Application Laid-Open No. 2000-098433).

Here, taking account of the amplification wavelength band spreading to the longer wavelength side, signal light including a channel wavelength of $(\lambda_p+\Delta\lambda+\delta\lambda)$ or longer, i.e., a wavelength of $(\lambda_p+\Delta\lambda+20$ nm) or longer, fails to yield a sufficient Raman amplification gain with pumping light having a wavelength $\lambda_p$. Such a restriction on the wavelength band caused by the pumping light wavelength $\lambda_p$ similarly occurs when a plurality of channels of pumping light are supplied.

In the Raman amplifier 1 and Raman amplification method shown in FIG. 1, by contrast, the pumping light having the wavelength $\lambda_p$ Raman-amplifies signal light (first signal light) having a channel wavelength within a wavelength band with a band width of 40 nm defined by wavelengths of $(\lambda_p+\Delta\lambda\pm 20$ nm). Thus Raman-amplified signal light is caused to function as pumping light for signal light (second signal light) in another wavelength band, whereby signal light including a channel wavelength of $(\lambda_p+\Delta\lambda+20$ nm) or longer, e.g., a wavelength of $(\lambda_p+120$ nm) or longer, can be Raman-amplified.

Namely, with respect to WDM signal light propagating through an optical fiber transmission line including the amplification optical fiber 10, the Raman amplifier 1 can Raman-amplify, when the pumping light having the wavelength $\lambda_p$ is supplied thereto, not only signal light including a channel wavelength within the wavelength band defined by wavelengths of $(\lambda_p+\Delta\lambda\pm 20$ nm), but also signal light including a channel wavelength within a wavelength band on the longer wavelength having a wavelength of $(\lambda_p+\Delta\lambda+20$ nm) or longer. This can broaden the amplification wavelength band capable of Raman-amplifying signal light. Also, it becomes unnecessary to divide WDM signal light into a plurality of wavelength bands and carry out Raman amplification in each of thus divided wavelength bands, and so forth, whereby the amplification wavelength band can be widened while simplifying the configuration as an optical amplifier.

The Raman amplifier 1 shown in FIG. 1 is configured such that the pumping light supplied from the pumping light sources 11, 12 acting as pumping light supply means to the amplification optical fiber 10 has only one channel wavelength $\lambda_p$. Alternatively, the pumping light supply means may be configured so as to supply a plurality of channels of pumping light having wavelengths different from each other. This, together with the above-mentioned configuration for causing a part of the WDM signal light to function as pumping light, can further widen the Raman amplification wavelength band. Employable as the pumping light supply means for supplying a plurality of channels of pumping light, for example, is a pumping light source unit comprising a plurality of pumping light sources outputting respective wavelengths of pumping light different from each other.

When the pumping light source 11 is utilized alone, the pumping light traveling direction becomes the same as the signal light traveling direction as shown in FIG. 1. Such Raman amplification in a copropagation-pumping configuration can secure a sufficient Raman amplification gain throughout the amplification wavelength band.

When the pumping light source 12 is utilized alone in the configuration shown in FIG. 1, the pumping light traveling direction is opposite from the signal light traveling direction. Such Raman amplification in a counterpropagation-pumping configuration effectively restrains signals from deteriorating due to nonlinear phenomena in the amplification optical fiber.

When both the pumping light sources 11 and 12 are utilized in the configuration shown in FIG. 1, forward pumping light whose traveling direction is the same as the signal light pumping direction and the backward pumping light whose traveling direction is opposite from the signal light pumping direction are supplied to the amplification optical fiber 10. Such Raman amplification in a bidirectional pump configuration can secure a sufficient Raman amplification gain and restrain signals from deteriorating due to nonlinear phenomena at the same time.

The configurations of Raman amplifier such as copropagation-pumping, counterpropagation-pumping, and bi-directional-pumping are preferably set in view of specific conditions such as the wavelength band of WDM signal light to be amplified. For example, in the bidirectional pump configuration, the wavelength of pumping light supplied from the forward pumping light source 11 and the wavelength of pumping light supplied from the backward pumping light source 12 may differ from each other.

Preferably, the amplification optical fiber 10 utilized for Raman amplification includes a unitary optical fiber capable of Raman-amplifying signal light. This makes the structure of the optical amplifier simpler than that in configurations in which a plurality of kinds of optical fibers are optically coupled together so as to carry out Raman amplification, such as one using a Raman amplification silica type optical fiber and a rare-earth-doped optical fiber together.

An optical transmission system employing the above-mentioned Raman amplifier will now be explained.

Figure 3:
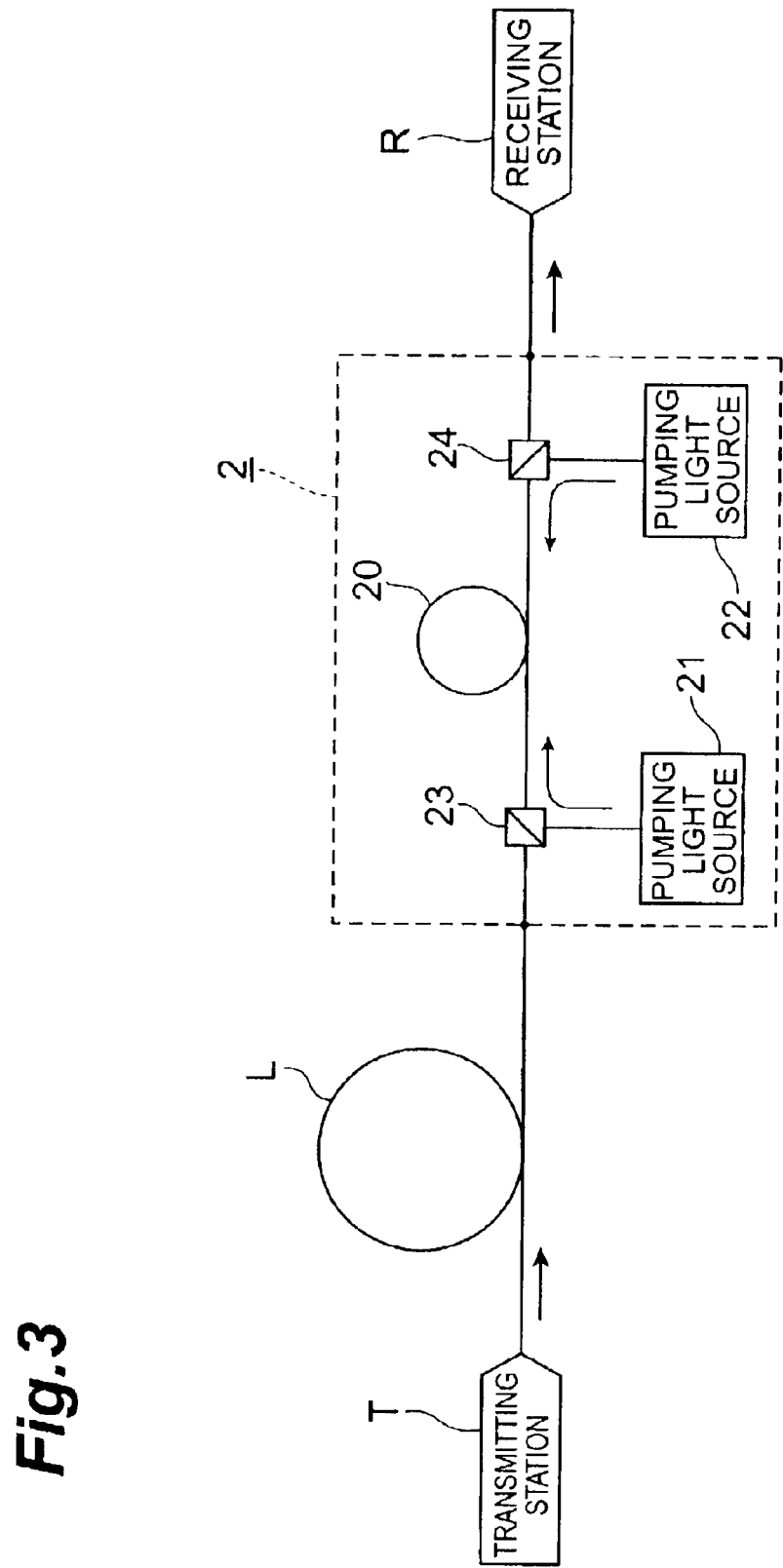
FIG. 3 is a view showing the configuration of a first embodiment of the optical transmission system according to the present invention.

FIG. 3 is a view showing the configuration of a first embodiment of the optical transmission system according to the present invention. The optical transmission system according to the first embodiment comprises a transmitting station (transmitter) T through which a plurality of channels of signal light having wavelengths different from each other within a predetermined signal wavelength band propagates, an optical fiber transmission line L through which the WDM signal light from the transmitting station T propagates, and a receiving station (receiver) R for receiving the WDM signal light having propagated through the optical fiber transmission line L.

Placed at a predetermined position on the optical fiber transmission line L is a Raman amplifier 2 having the same structure as that shown in FIG. 1. The Raman amplifier 2 is an optical device Raman-amplifying the WDM signal light propagating through the optical fiber transmission line L.

In the first embodiment, the Raman amplifier 2 comprises an amplification optical fiber 20, pumping light sources 21, 22 for supplying a predetermined wavelength of pumping light, and optical multiplexers 23, 24 for guiding the respective pumping light components from the pumping light sources 21, 22 to the amplification optical fiber 20. The amplification optical fiber 20 in the Raman amplifier 2 is an optical fiber provided separately from the optical fiber transmission line L. Here, the Raman amplifier 2 functions as a lumped optical amplifier.

Even when transmitting WDM signal light in a wider signal wavelength band, all of a plurality of channels included in the WDM signal light can fully be Raman-amplified if a Raman amplifier having a structure similar to that shown in FIG. 1 is thus employed as the lumped Raman amplifier 2, so as to enable favorable optical transmission.

Figure 4:
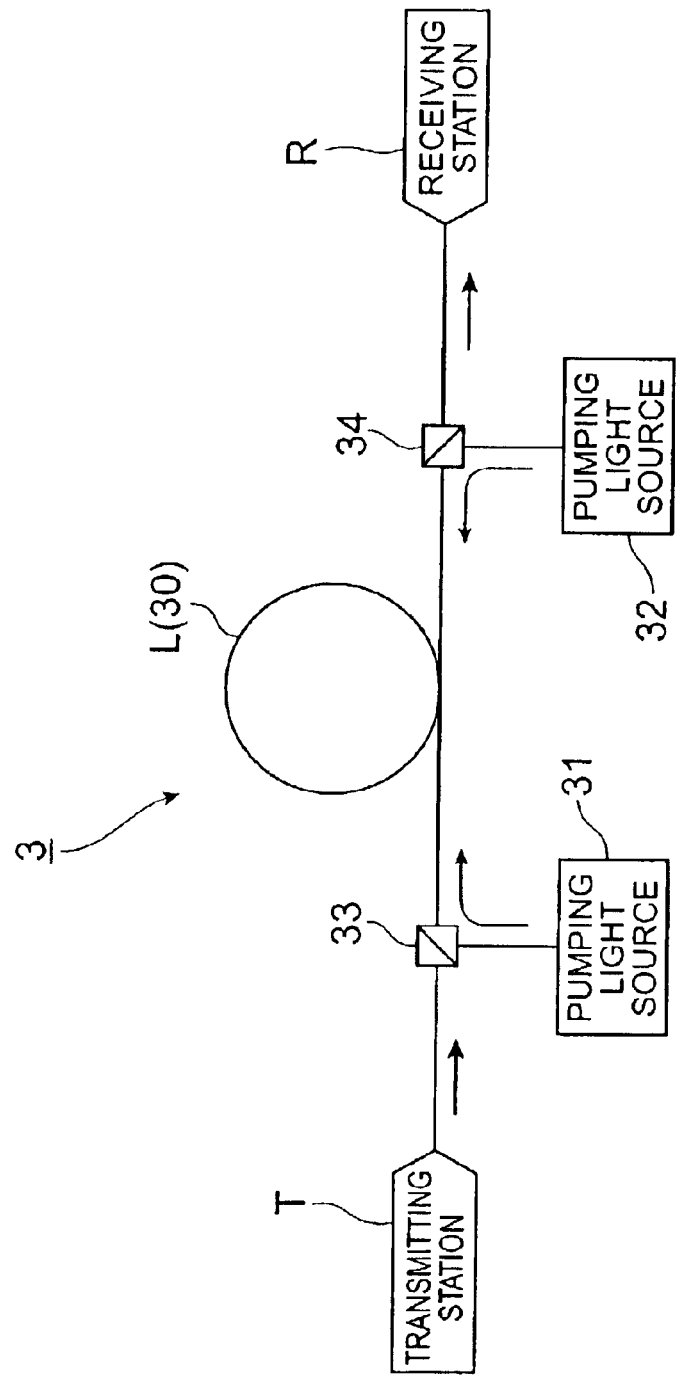
FIG. 4 is a view showing the configuration of a second embodiment of the optical transmission system according to the present invention.

FIG. 4 is a view showing the configuration of a second embodiment of the optical transmission system according to the present invention. The optical transmission system according to the second embodiment comprises a transmitting station T for transmitting WDM signal light, an optical fiber transmission line L through which the WDM signal light from the transmitting station T propagates, and a receiving station R for receiving the WDM signal light having propagated through the optical fiber transmission line L.

Placed at a predetermined position on the optical fiber transmission line L is a Raman amplifier 3 having a structure similar to that shown in FIG. 1. The Raman amplifier 3 is an optical device for Raman-amplifying the WDM signal light propagating through the optical fiber transmission line L.

In the second embodiment, the Raman amplifier 3 comprises an amplification optical fiber 30, pumping light sources 31, 32 for supplying a predetermined wavelength of pumping light, and optical multiplexers 33, 34 for guiding the respective pumping light components from the pumping light sources 31, 32 to the amplification optical fiber 30. The amplification optical fiber 30 constitutes a part of the optical fiber transmission line L. Here, the Raman amplifier 3 functions as a distributed constant optical amplifier.

Even when transmitting WDM signal light in a wide signal wavelength band, all of a plurality of channels included in the WDM signal light can fully be Raman-amplified if a Raman amplifier having a structure similar to that shown in FIG. 1 is thus employed as the distributed constant Raman amplifier 3, so as to enable favorable optical transmission.

Figure 5:
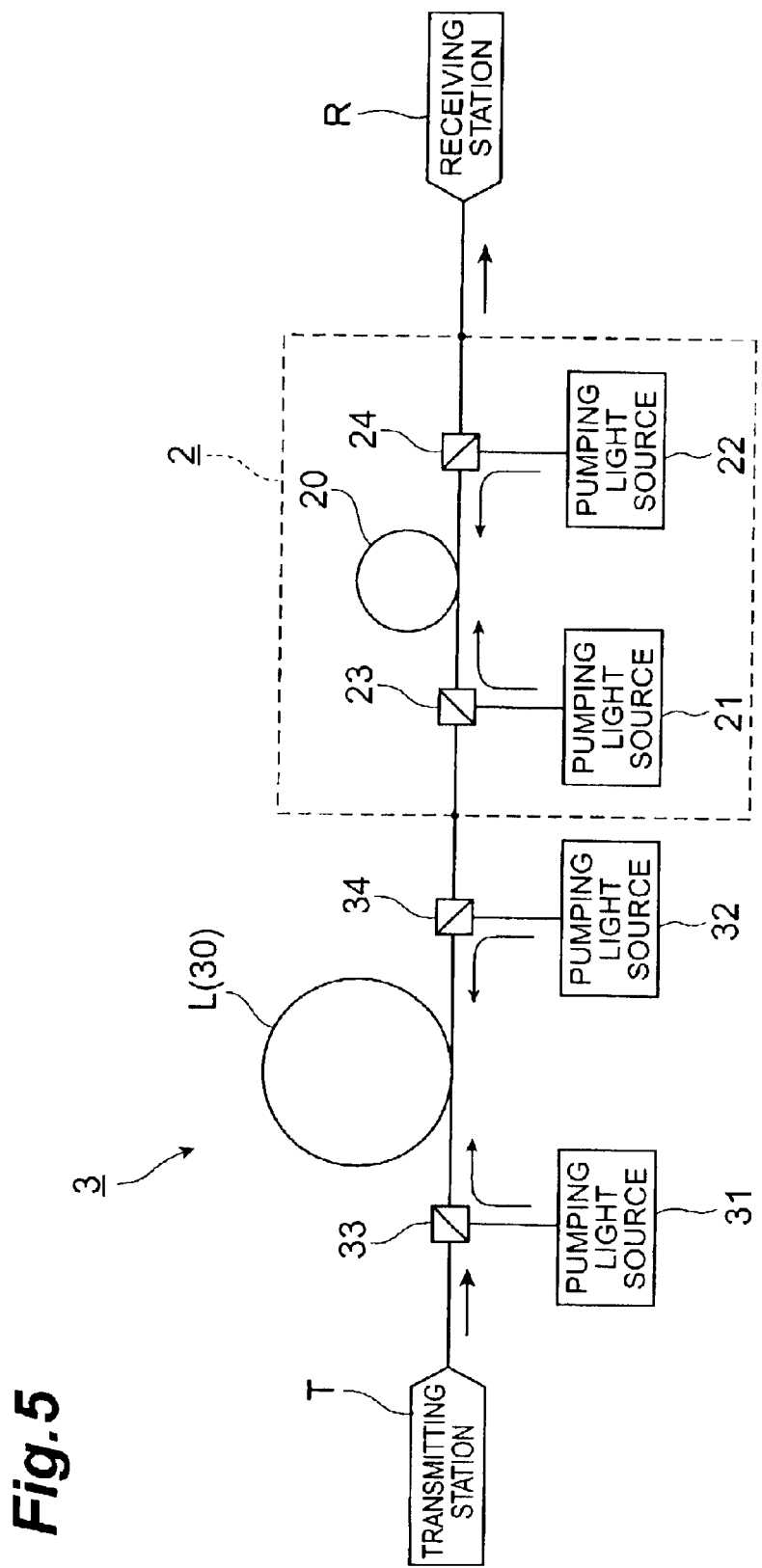
FIG. 5 is a view showing the configuration of a third embodiment of the optical transmission system according to the present invention.

FIG. 5 is a view showing the configuration of a third embodiment of the optical transmission system according to the present invention. The optical transmission system according to the third embodiment comprises a transmitting station T for transmitting WDM signal light, an optical fiber transmission line L through which the WDM signal light from the transmitting station T propagates, and a receiving station R for receiving the WDM signal light having propagated through the optical fiber transmission line L.

The optical transmission system according to the third embodiment comprises both of the lumped Raman amplifier (first Raman amplifier) 2 shown in FIG. 3 and the distributed constant Raman amplifier (second Raman amplifier) 3 shown in FIG. 4. Such a configuration can also Raman-amplify all of a plurality of channels included in WDM signal light, thus enabling favorable optical transmission.

Preferably, in the optical transmission system employing the Raman amplifier having the above-mentioned configuration, a predetermined channel of light in a plurality of channels included in the WDM signal light has a power higher than the input signal light power to the optical fiber transmission line L in a predetermined segment of the optical fiber transmission line L. This can fully Raman-amplify signal light throughout a wide amplification wavelength band.

Specifically, if the power of first signal light on the shorter wavelength side utilized as pumping light for second signal light on the longer wavelength side is made higher in a predetermined segment, the second signal light can be Raman-amplified with a sufficient gain. Preferably, the input power to the optical fiber transmission line L is identical among the individual signal channels included in the signal light. This facilitates power control of each signal channel in the optical transmission system.

When a greater number of channels are included in the WDM signal light, they are preferably used in order of elongating wavelength. This can favorably widen the amplification wavelength band effected by Raman amplification. If a channel of light (signal light) utilized as pumping light for another signal light in a plurality of signal channels does not propagate through the optical fiber transmission line, it is preferred that dummy signal light for Raman amplification at the same wavelength be transmitted. This enables favorable Raman amplification throughout the amplification wavelength band regardless of the transmission state of WDM signal light (state of use of signal channels).

A specific configuration for making such dummy light transmittable includes, for example, one in which the transmitting station T for transmitting WDM signal light in the optical transmission system according to the first embodiment shown in FIG. 3 including the Raman amplifier 2 transmits signal light as a dummy for Raman amplification even when not using a part of signal channels. Alternatively, a light source for supplying dummy signal light may be provided separately from the transmitting station T.

Figure 6:
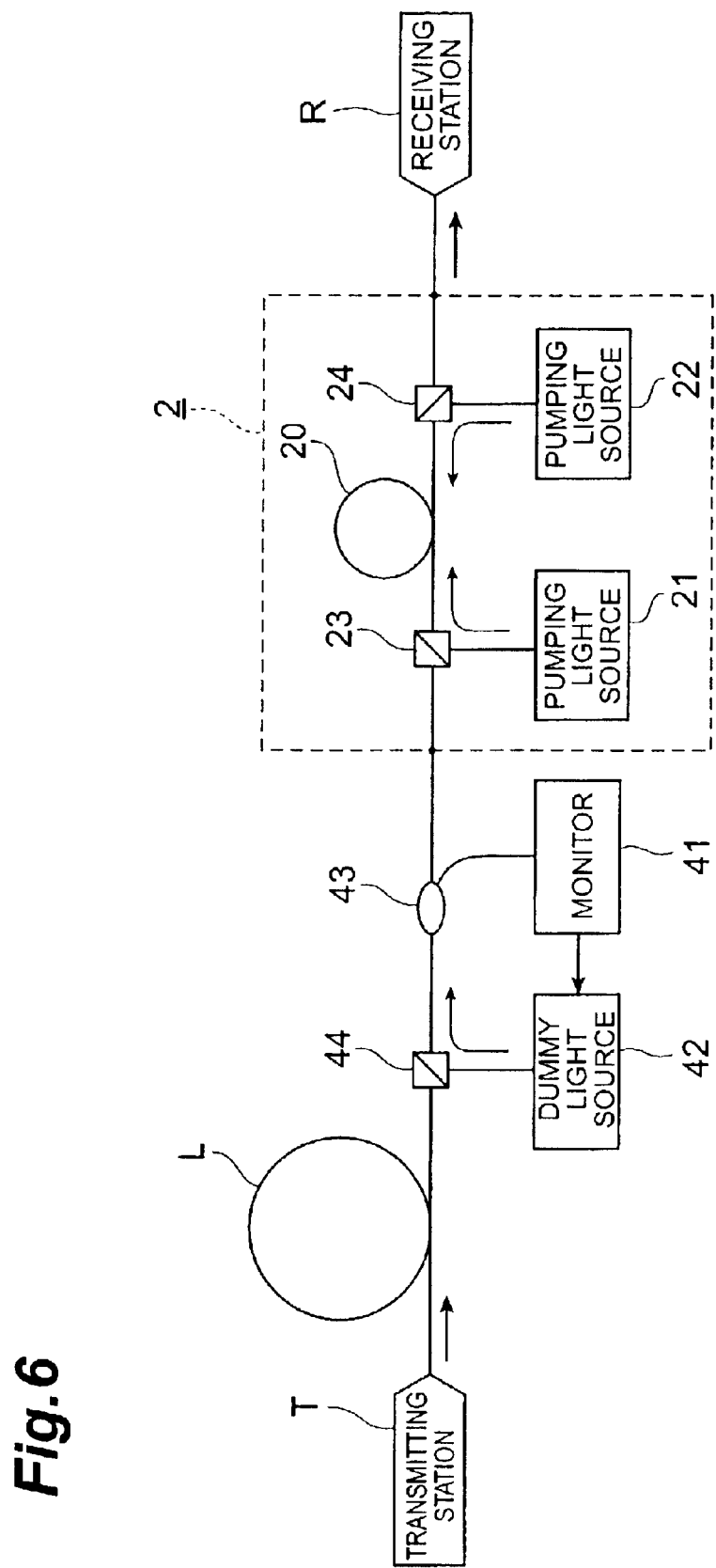
FIG. 6 is a view showing the configuration of a fourth embodiment of the optical transmission system according to the present invention.

FIG. 6 is a view showing the configuration of a fourth embodiment of the optical transmission system according to the present invention. The optical transmission system according to the fourth embodiment has substantially the same structure as that of the optical transmission system according to the first embodiment shown in FIG. 3; and comprises a transmitting station T for transmitting WDM signal light, an optical fiber transmission line L through which the WDM signal light from the transmitting station T propagates, a receiving station R for receiving the WDM signal light having propagated through the optical fiber transmission line L, and a distributed constant Raman amplifier 2 placed at a predetermined position on the optical fiber transmission line L.

On the upstream side of the Raman amplifier 2 in the fourth embodiment, an optical multiplexer 44 and an optical branching device 43 are placed successively from the transmission station T to the receiving station R. A part of the WDM signal light propagating through the optical fiber transmission line L is branched out by the optical branching device 43, so as to be fed into a signal light monitor 41. The signal light monitor 41 monitors whether each signal channel of light is active or not.

The result of monitoring of the transmission state of WDM signal light effected by the signal light monitor 41 is sent to a dummy light source 42. If it is seen from the inputted monitoring result of WDM signal light that the signal channel of light utilized as pumping light is not active, the dummy light source 42 outputs dummy signal light having the same wavelength as that of this signal channel. The dummy signal light outputted from the dummy light source 42 is forwardly guided to the Raman amplifier 2 by way of the optical multiplexer 44. Such a configuration can also supply the dummy signal light as Raman amplification pumping light to the Raman amplifier 2.

The Raman amplification of WDM signal light effected by the above-mentioned Raman amplification method and Raman amplifier will now be explained specifically. Each of the following specific examples shows results of a computer simulation.

Figures 7, 8:
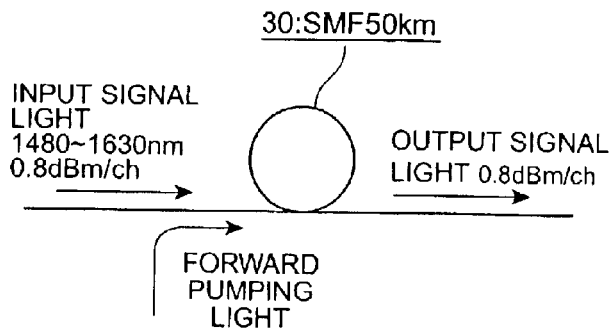
FIG. 7 is a schematic view for explaining a first example of Raman amplification.
FIG. 8 is a table for explaining pumping light supplied to a single-mode fiber in the first example of Raman amplification.

FIG. 7 is a schematic view for explaining a first example of Raman amplification. The first example utilizes a single-mode fiber (SMF) 30, which is an optical fiber constituting an optical fiber transmission line, having a fiber length of 50 km as an amplification optical fiber, thereby carrying out distributed constant Raman amplification. As for the supply of pumping light to the SMF 30, only a copropagation-pumping configuration is employed.

The signal wavelength band of WDM signal light to be Raman-amplified is set to 1480 to 1630 nm. The input signal light power is 0.8 dBm/ch, and the output signal light power is about 0.8 dBm/ch as well.

With respect to the above-mentioned signal wavelength band, FIG. 8 shows the wavelength $\lambda$ (nm) of pumping light supplied to the SMF 30 and the pumping light power p (dBm). As shown in this table, 16 channels of pumping light within the wavelength range of 1382 to 1457 nm are forwardly supplied to the SMF 30. The wavelength range in which the respective gain peaks in the individual pumping channels are distributed, which is obtained when the wavelength range of the above-mentioned pumping channels is shifted by $\Delta\lambda$ (=100 nm), is 1482 to 1557 nm.

When first signal light on the shorter wavelength side of WDM signal light is Raman-amplified with pumping light whereas thus Raman-amplified first signal light is utilized as pumping light for second signal light on the longer wavelength side, it is necessary that the first signal light be fully Raman-amplified on the upstream side of the SMF 30. Hence, for attaining a high gain in a wide band of Raman amplification, copropagatiin-pumping is preferably employed.

Figure 9:
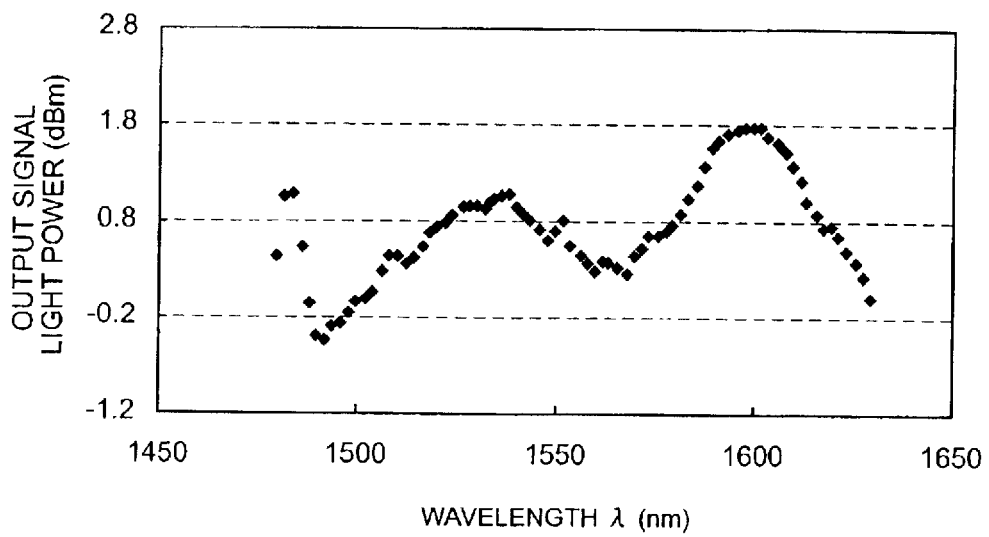
FIG. 9 is a graph showing the wavelength dependence of output power of signal light in the first example of Raman amplification.

FIG. 9 is a graph showing the wavelength dependence of output power of WDM signal light in the first example of Raman amplification, in which the abscissa and ordinate indicate signal light wavelength $\lambda$ (nm) and output power (dBm), respectively. It is seen from this graph that signal light is Raman-amplified throughout the signal wavelength band and, in particular, signal light including a channel wavelength of ($\lambda_p+\Delta\lambda 20$ nm=$\lambda_p$+120 nm) or longer with respect to the wavelength $\lambda_p$ of pumping light is fully Raman-amplified as well. Also, the fluctuation of output power in the whole wavelength band having a bandwidth of 150 nm is about 2.2 dBm, thus being sufficiently small.

Figure 10:
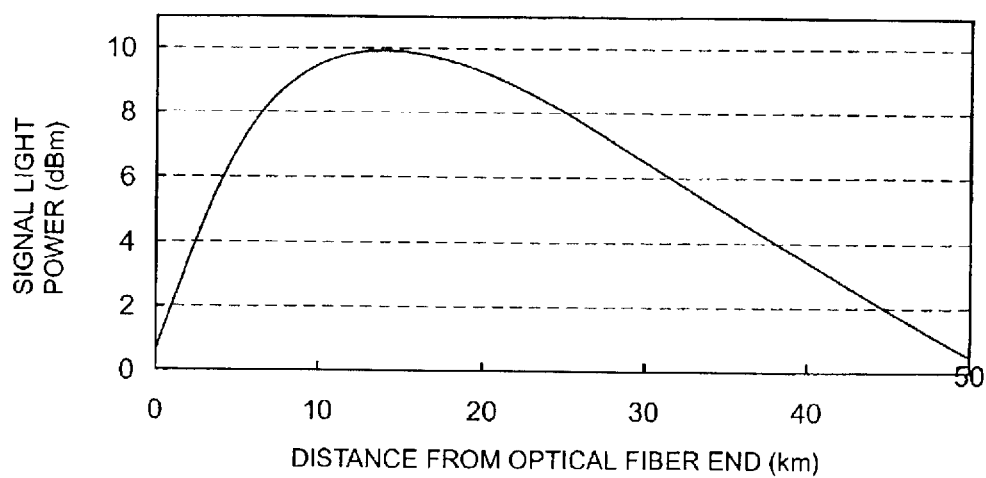
FIG. 10 is a graph showing the power change of signal light in an optical fiber in the first example of Raman amplification.

FIG. 10 is a graph showing the power change in the SMF 30 at a channel wavelength of 1480 nm, which is the shortest wavelength in the WDM signal light, in the first example of Raman amplification, in which the abscissa indicates the position (km) in the SMF 30, whereas the ordinate indicates the signal light power (dBm) at each position. It is seen from this graph that the power of signal light at the wavelength of 1480 nm is about 10 dBm at the maximum on the upstream side of the SMF 30, thus being very high.

This is advantageous in Raman-amplifying signal light including a channel wavelength on the longer wavelength side on the downstream side of the SMF 30. However, since the signal waveform may deteriorate due to nonlinear phenomena if the signal light power is too strong, it is preferred that a favorable range of signal light power be employed in view of such a condition as well.

Figures 11, 12:
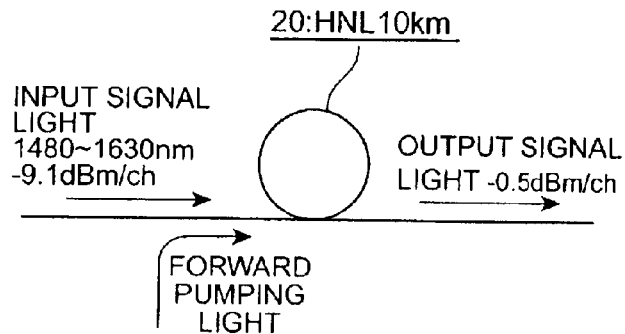
FIG. 11 is a schematic view for explaining a second example of Raman amplification.
FIG. 12 is a table for explaining pumping light supplied to a highly nonlinear fiber in the second example of Raman amplification.

FIG. 11 is a schematic view for explaining a second example of Raman amplification. The second example utilizes a highly nonlinear fiber (HNL) 20, which is an optical fiber provided separately from the optical fiber transmission line, having a fiber length of 10 km as an amplification optical fiber, thereby carrying out lumped Raman amplification. As for the supply of pumping light to the HNL 20, only a copropagation-pumping configuration is employed. The signal wavelength band of WDM signal light to be Raman-amplified is set to 1480 to 1630 nm. The input signal light power is −9.1 dBm/ch, whereas the output signal light power is about −0.5 dBm/ch.

With respect to the above-mentioned signal wavelength band, FIG. 12 shows the wavelength λ and power p of the pumping light supplied to the HNL 20. As shown in this table, 12 channels of pumping light within the wavelength range of 1382 to 1452 nm are forwardly supplied to the HNL 20.

Figure 13:
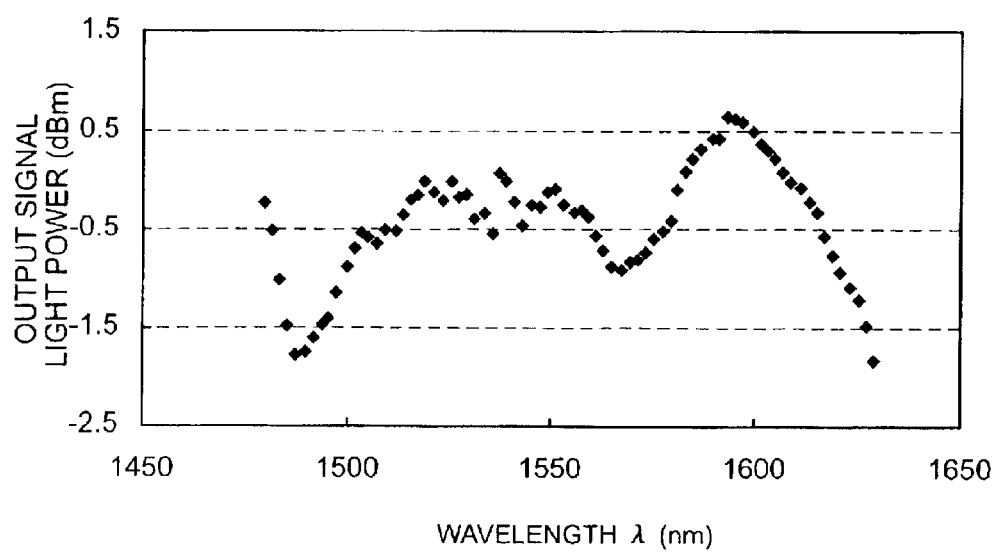
FIG. 13 is a graph showing the wavelength dependence of output power of signal light in the second example of Raman amplification.

FIG. 13 is a graph showing the wavelength dependence of output power of WDM signal light in the second example of Raman amplification. It is seen from this graph that signal light is Raman-amplified throughout the signal wavelength band and, in particular, signal light including a channel wavelength of ($λ_p$+120 nm) or longer with respect to the wavelength $λ_p$ of pumping light is fully Raman-amplified as well. Also, the fluctuation of output power in the whole wavelength band having a bandwidth of 150 nm is about 2.4 dBm, thus being sufficiently small.

Figure 14:
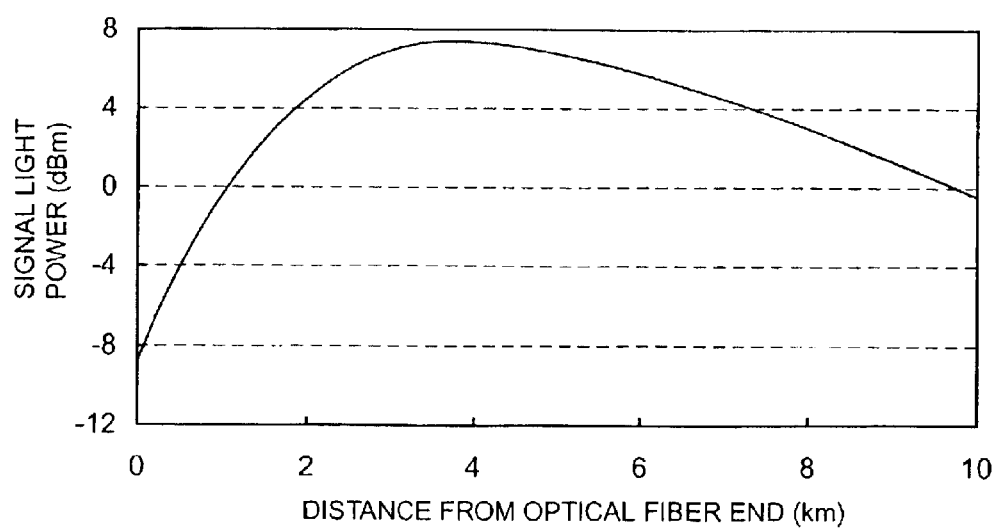
FIG. 14 is a graph showing the power change of signal light in an optical fiber in the second example of Raman amplification.

FIG. 14 is a graph showing the power change in the HNL 20 at a channel wavelength of 1480 nm, which is the shortest wavelength in the WDM signal light, in the second example of Raman amplification. It is seen from this graph that the power of signal light at the channel wavelength of 1480 nm is about 7 dBm at the maximum, thus being very high as in the first example of Raman amplification. In the second example of Raman amplification, since the HNL 20 is utilized as an amplification optical fiber, it is preferred that a signal light power in a favorable range be set in view of the deterioration in signal waveform caused by high nonlinearity.

Figures 15, 16:
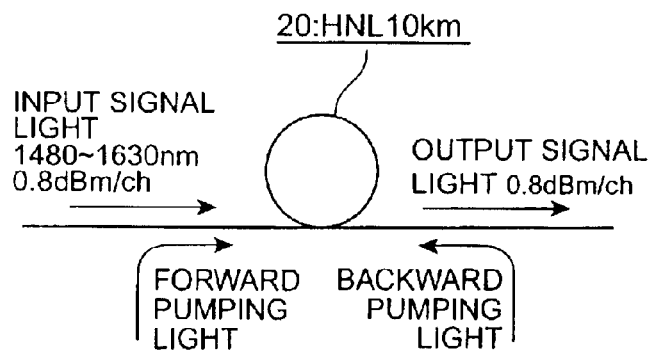
FIG. 15 is a schematic view for explaining a third example of Raman amplification.
FIG. 16 is a table for explaining pumping light supplied to a highly nonlinear fiber in the third example of Raman amplification.

FIG. 15 is a schematic view for explaining a third example of Raman amplification. The third example utilizes a highly nonlinear fiber (HNL) 20, which is an optical fiber provided separately from the optical fiber transmission line, having a fiber length of 10 km as an amplification optical fiber, thereby carrying out lumped Raman amplification. As for the supply of pumping light to the HNL 20, a bidirectional pump configuration including both forward and backward directions is employed.

The signal wavelength band of WDM signal light to be Raman-amplified is set to 1480 to 1630 nm. The input signal light power is −2.5 dBm/ch, whereas the output signal light power is about 4 dBm/ch.

With respect to the above-mentioned signal wavelength band, FIG. 16 shows the wavelength λ and power p of the pumping light supplied to the HNL 20. As shown in this table, one channel of pumping light at a wave length of 1387 nm is forwardly supplied to the HNL 20. On the other hand, nine channels of pumping light within the wavelength range of 1397 to 1477 nm are backwardly supplied thereto.

Figure 17:
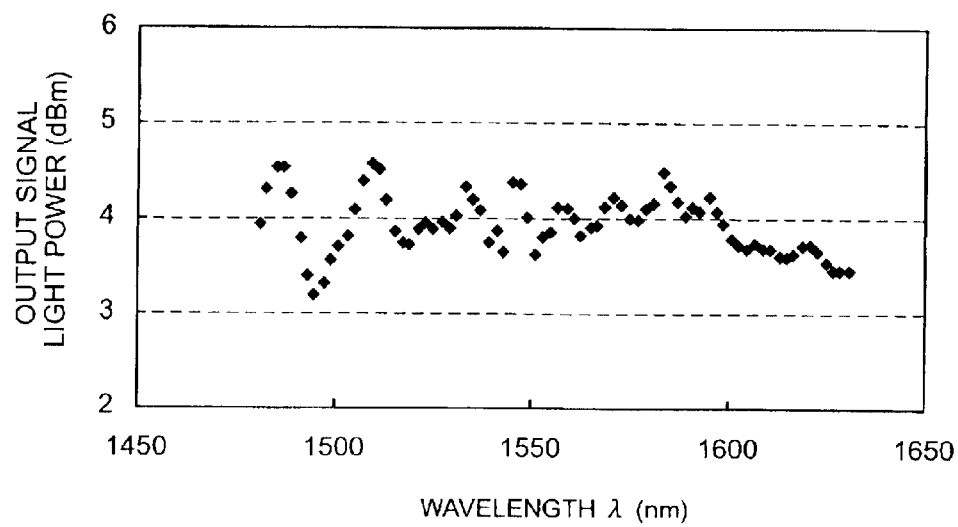
FIG. 17 is a graph showing the wavelength dependence of output power of signal light in the third example of Raman amplification.

FIG. 17 is a graph showing the wavelength dependence of output power of WDM signal light in the third example of Raman amplification. It is seen from this graph that signal light is Raman-amplified throughout the signal wavelength band and, in particular, signal light including a channel wavelength of ($λ_p$+120 nm) or longer with respect to the wavelength $λ_p$ of pumping light is fully Raman-amplified as well. Also, the fluctuation of output power in the whole wavelength band having a bandwidth of 150 nm is about 1.4 dBm, thus being sufficiently small.

Figure 18:
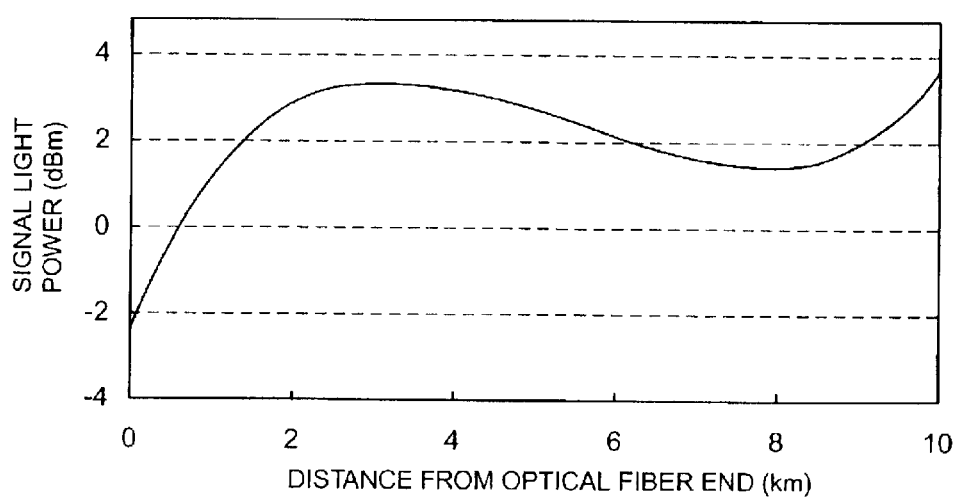
FIG. 18 is a graph showing the power change of signal light in an optical fiber in the third example of Raman amplification.

FIG. 18 is a graph showing the power change in the HNL 20 at a channel wavelength of 1480 nm, which is the shortest wavelength in the WDM signal light, in the third example of Raman amplification. It is seen from this graph that the power of signal light at the channel wavelength of 1480 nm is suppressed to about 4 dBm at the maximum. This indicates that the signal light power is restrained from increasing on the upstream side of the HNL 20 due to the fact that the pumping light is supplied to the HNL 20 bidirectionally. This prevents signal waveforms from deteriorating due to nonlinear phenomena.

Figures 19, 20:
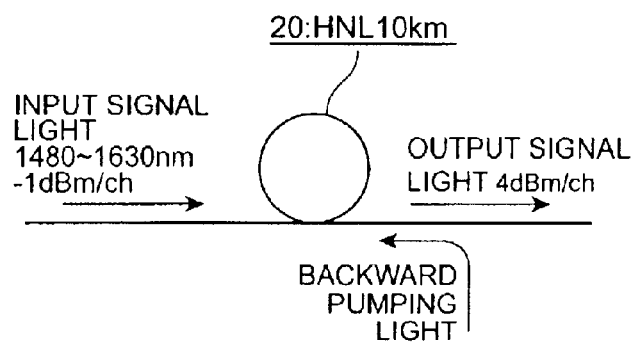
FIG. 19 is a schematic view for explaining a fourth example of Raman amplification.
FIG. 20 is a table for explaining pumping light supplied to a highly nonlinear fiber in the fourth example of Raman amplification.

FIG. 19 is a schematic view for explaining a fourth example of Raman amplification. The fourth example utilizes a highly nonlinear fiber (HNL) 20, which is an optical fiber provided separately from the optical fiber transmission line, having a fiber length of 10 km as an amplification optical fiber, thereby carrying out lumped Raman amplification. As for the supply of pumping light to the HNL 20, only a counterpropagation-pumping configuration is employed.

The signal wavelength band of WDM signal light to be Raman-amplified is set to 1480 to 1630 nm. The input signal light power is −1 dBm/ch, whereas the output signal light power is about 4 dBm/ch.

With respect to the above-mentioned signal wavelength band, FIG. 20 shows the wavelength λ and power p of the pumping light supplied to the HNL 20. As shown in this table, nine channels of pumping light within the wavelength range of 1385 to 1475 nm are backwardly supplied to the HNL 20.

Figure 21:
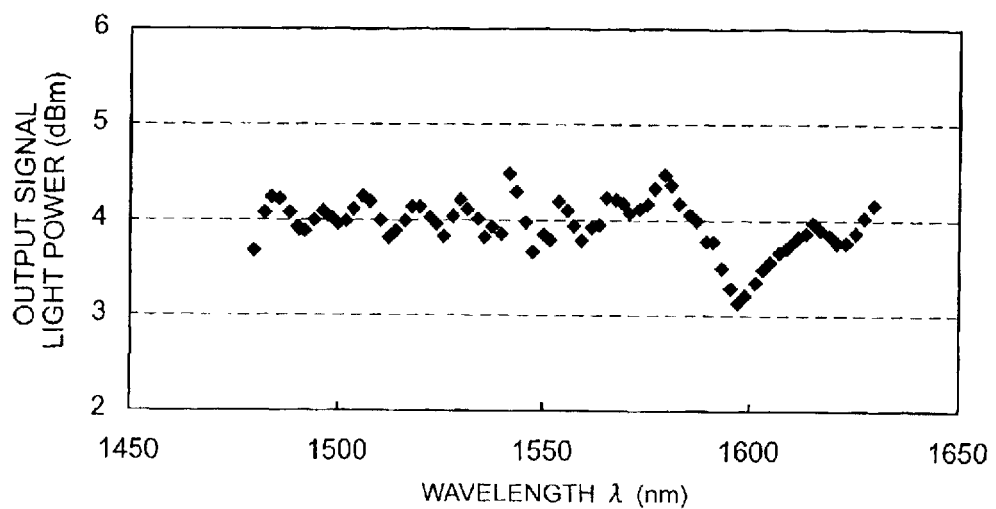
FIG. 21 is a graph showing the wavelength dependence of output power of signal light in the fourth example of Raman amplification.

FIG. 21 is a graph showing the wavelength dependence of output power of WDM signal light in the fourth example of Raman amplification. It is seen from this graph that signal light is Raman-amplified throughout the signal wavelength band and, in particular, signal light including a channel wavelength of ($λ_p$+120 nm) or longer with respect to the wavelength $λ_p$ of pumping light is fully Raman-amplified as well. Also, though the Raman amplification gain is lower than that in the copropagation-pumping or bi-directional-pumping due to the counterpropagation-pumping, the fluctuation of output power in the whole wavelength band having a bandwidth of 150 nm is about 1.3 dBm, thus being sufficiently small.

Figure 22:
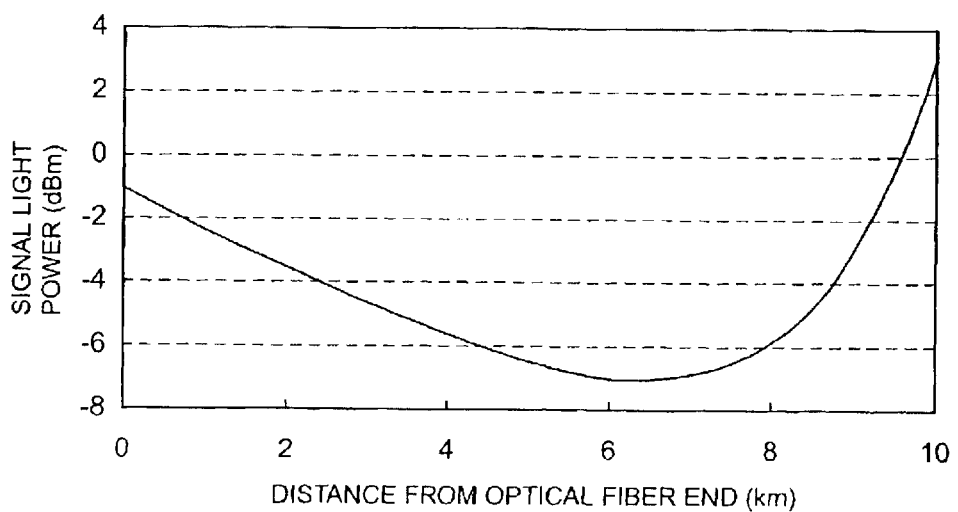
FIG. 22 is a graph showing the power change of signal light in an optical fiber in the fourth example of Raman amplification.

FIG. 22 is a graph showing the power change in the HNL 20 at a channel wavelength of 1480 nm, which is the shortest wavelength in the WDM signal light, in the fourth example of Raman amplification. It is seen from this graph that the power of signal light at the channel wavelength of 1480 nm is suppressed to about 4 dBm at the maximum, thus being lower than that in bidirectional pump in total.

Figures 23, 24:
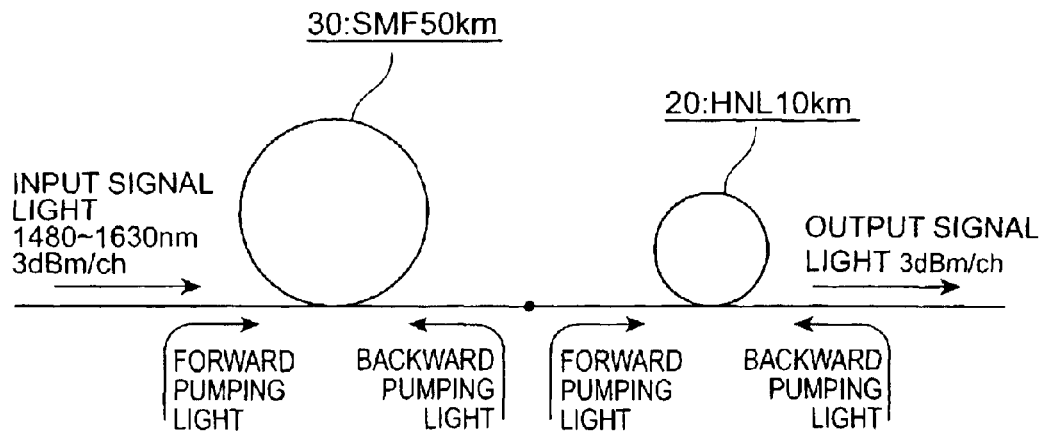
FIG. 23 is a schematic view for explaining a fifth example of Raman amplification.
FIG. 24 is a table for explaining pumping light supplied to a single-mode fiber in the fifth example of Raman amplification.

FIG. 23 is a schematic view for explaining a fifth example of Raman amplification. The fifth example carries out distributed constant Raman amplification utilizing a single-mode fiber (SMF) 30 having a fiber length of 50 km as an amplification optical fiber, and lumped Raman amplification utilizing a highly nonlinear fiber (HNL) 20 having a fiber length of 10 km as an amplification optical fiber. As for the supply of pumping light to the SMF 30, a bidirectional pump configuration combining forward and backward directions is employed. As for the supply of pumping light to the HNL 20, a bidirectional pump configuration is similarly employed.

The signal wavelength band of WDM signal light to be Raman-amplified is set to 1480 to 1630 nm. The input signal light power is 3 dBm/ch, and the output signal light power is about 3 dBm/ch as well.

With respect to the above-mentioned signal wavelength band, FIG. 24 shows the wavelength λ and power p of the pumping light supplied to the SMF 30. As shown in this table, five channels of pumping light within the wavelength range of 1382 to 1422 nm are forwardly supplied to the SMF 30. Also, four channels of pumping light within the wavelength range of 1432 to 1462 nm are backwardly supplied thereto. On the other hand, FIG. 25 shows the wavelength λ and power p of the pumping light supplied to the HNL 20. As shown in this table, one channel of pumping light at a wavelength of 1385 nm is forwardly supplied to the HNL 20. Also, nine channels of pumping light within the wavelength range of 1395 to 1475 nm are backwardly supplied thereto.

Figure 26:
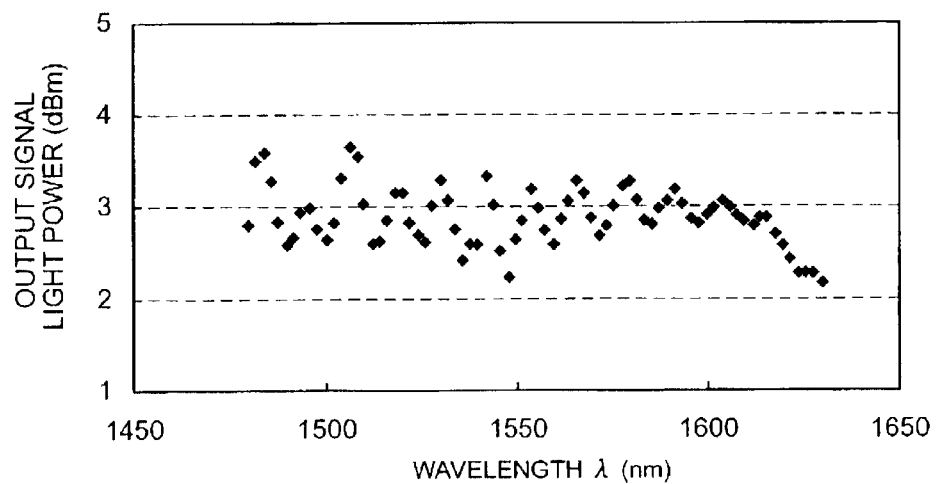
FIG. 26 is a graph showing the wavelength dependence of output power of signal light in the fifth example of Raman amplification.

FIG. 26 is a graph showing the wavelength dependence of output power of WDM signal light in the fifth example of Raman amplification. It is seen from this graph that signal light is Raman-amplified throughout the signal wavelength band and, in particular, signal light including a channel wavelength of ($\lambda_p$+120 nm) or longer with respect to the wavelength $\lambda_p$ of pumping light is fully Raman-amplified as well. Also, the fluctuation of output power in the whole wavelength band having a bandwidth of 150 nm is about 1.4 dBm, thus being sufficiently small.

Figure 27:
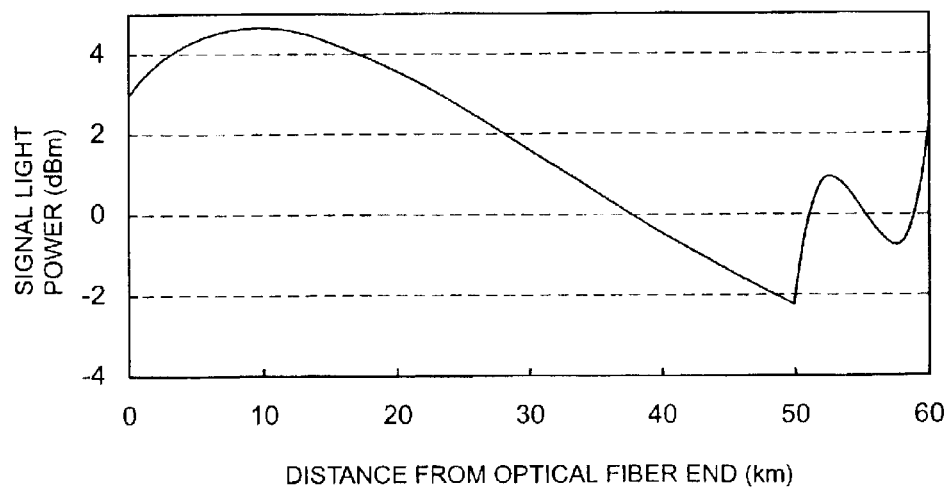
FIG. 27 is a graph showing the power change of signal light in an optical fiber in the fifth example of Raman amplification.

FIG. 27 is a graph showing the power change in the SMF 30 and HNL 20 at a channel wavelength of 1480 nm, which is the shortest wavelength in the WDM signal light, in the fifth example of Raman amplification. It is seen from this graph that the power of signal light at the channel wavelength of 1480 nm is fully suppressed, since the distributed constant and lumped Raman amplifications are used together, so as to disperse the gain.

Figures 28, 29:
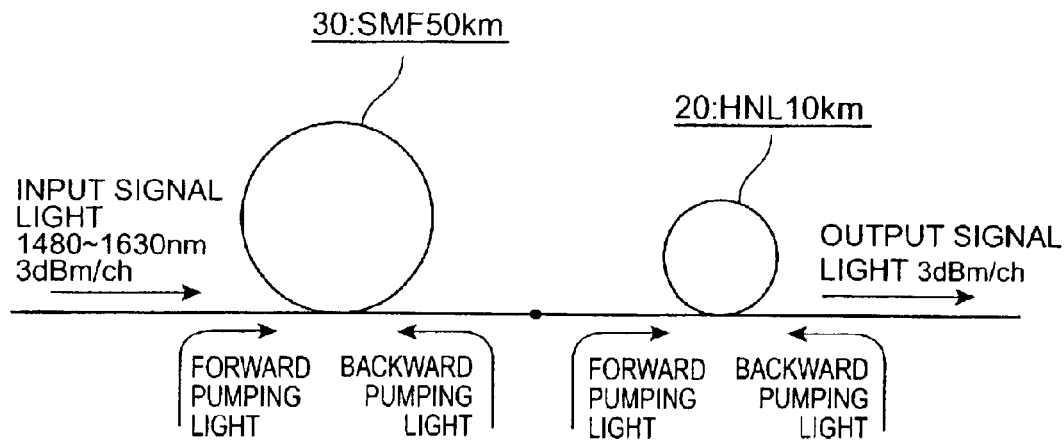
FIG. 28 is a schematic view for explaining a sixth example of Raman amplification.
FIG. 29 is a table for explaining pumping light supplied to a single-mode fiber in the sixth example of Raman amplification.

FIG. 28 is a schematic view for explaining a sixth example of Raman amplification. The sixth example carries out distributed constant Raman amplification utilizing a single-mode fiber (SMF) 30 having a fiber length of 50 km as an amplification optical fiber, and lumped Raman amplification utilizing a highly nonlinear fiber (HNL) 20 having a fiber length of 10 km as an amplification optical fiber. As for the supply of pumping light to the SMF 30, a bidirectional pump configuration combining forward and backward directions is employed. As for the supply of pumping light to the HNL 20, a bidirectional pump configuration is similarly employed.

The signal wavelength band of WDM signal light to be Raman-amplified is set to 1450 to 1630 nm. This WDM signal light has a bandwidth of 180 nm, which is wider than the bandwidth of 150 nm in the fifth example of Raman amplification. The input signal light power is 3 dBm/ch, and the output signal light power is about 3 dBm/ch as well.

Figures 30, 31:
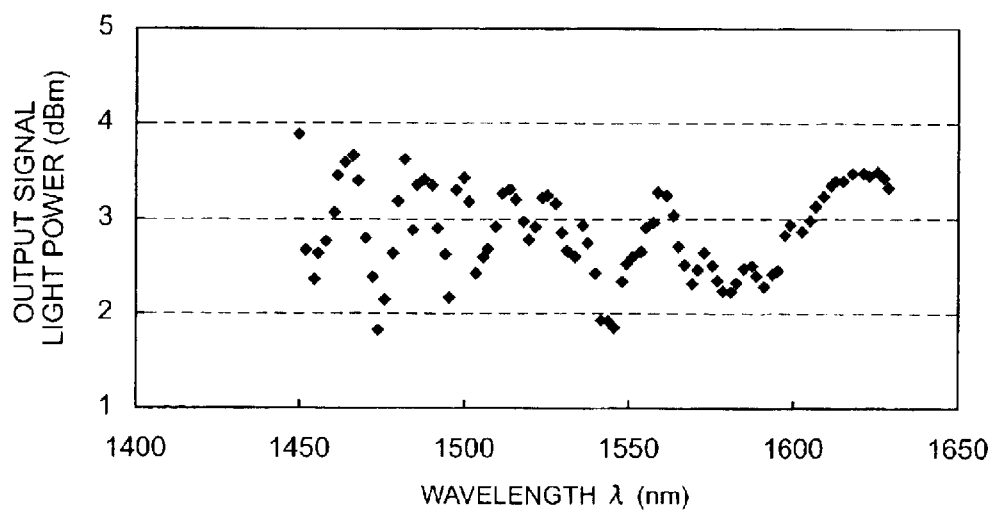
FIG. 30 is a table for explaining pumping light supplied to a highly nonlinear fiber in the sixth example of Raman amplification.
FIG. 31 is a graph showing the wavelength dependence of output power of signal light in the sixth example of Raman amplification.

With respect to the above-mentioned signal wavelength band, FIG. 29 shows the wavelength λ and power p of the pumping light supplied to the SMF 30. As shown in this table, five channels of pumping light within the wavelength range of 1350 to 1390 nm are forwardly supplied to the SMF 30. Also, four channels of pumping light within the wavelength range of 1400 to 1430 nm are backwardly supplied thereto. On the other hand, FIG. 30 shows the wavelength λ and power p of the pumping light supplied to the HNL 20. As shown in this table, one channel of pumping light at a wavelength of 1350 nm is forwardly supplied to the HNL 20. Also, seven channels of pumping light within the wavelength range of 1360 to 1430 nm are backwardly supplied thereto.

FIG. 31 is a graph showing the wavelength dependence of output power of WDM signal light in the sixth example of Raman amplification. It is seen from this graph that signal light is Raman-amplified throughout the wide signal wavelength band of 180 nm as well and, in particular, signal light including a channel wavelength of ($\lambda_p$+120 nm) or longer with respect to the wavelength $\lambda_p$ of pumping light is fully Raman-amplified as well. Also, the fluctuation of output power in the whole wavelength band having a bandwidth of 180 nm is about 2.1 dBm, thus being sufficiently small.

As in the foregoing, the present invention carries out Raman amplification by supplying pumping light having a wavelength $\lambda_p$ with respect to a predetermined signal wavelength band of WDM signal light, and causes a part of thus Raman-amplified light to function as Raman amplification pumping light, thereby Raman-amplifying signal light including a channel wavelength with a wavelength of ($\lambda_p$+Δλ+20 nm) or longer, where Δλ is the Raman shift amount of wavelength caused by the pumping light at the wavelength $\lambda_p$. This enables Raman amplification over a wider signal wavelength band, and simplifies the configuration of a Raman amplifier and the like.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A Raman amplification method for Raman-amplifying a plurality of channels of signal light having wavelengths different from each other, said method comprising the steps of:

Raman-amplifying a part of said signal light by supplying pumping light having a predetermined wavelength $\lambda_p$ from a pumping light source to an amplification optical fiber through which said signal light propagates, the predetermined wavelength $\lambda_p$ of said pumping light supplied from said pumping light supply means existing in a short wavelength side only rather than a signal wavelength band; and utilizing at least a part of said Raman-amplified light as pumping light so as to Raman-amplify signal light including a channel wavelength with a wavelength of ($\lambda_p$+Δλ+20 nm) or longer, where Δλ is the Raman shift amount of said pumping light at said wavelength $\lambda_p$.

2. A method according to claim 1, wherein said wavelength $\lambda_p$, of said pumping light is set so as to be able to Raman-amplify at least first signal light including a signal channel within a first wavelength band located on a shorter wavelength side in an amplification wavelength band in which said signal light is Raman-amplified, and wherein second signal light including a signal channel within a second wavelength band located on a longer wavelength side than is said first wavelength band in said amplification wavelength band is Raman-amplified with said Raman-amplified first signal light being used as pumping light.

3. A method according to claim 1, wherein, as said pumping light, a plurality of channels of pumping light having wavelengths different from each other are supplied to said amplification optical fiber.

4. A method according to claim 1, wherein said pumping light supplied to said amplification optical fiber propagates in the same direction as a traveling direction of said signal light.

5. A method according to claim 1, wherein said pumping light supplied to said amplification optical fiber propagates in a direction opposite from a traveling direction of said signal light.

6. A method according to claim 1, wherein said pumping light supplied to said amplification optical fiber includes forward pumping light propagating in the same direction as a traveling direction of said signal light, and backward pumping light propagating in a direction opposite from said traveling direction of said signal light.

7. A Raman amplifier for Raman-amplifying a plurality of channels of signal light having wavelengths different from each other, said Raman amplifier comprising:

an amplification optical fiber, through which said signal light therethrough propagates, Raman-amplifying a part of said signal light with pumping light having a wavelength $\lambda_p$;

pumping light supply means for supplying said pumping light to said amplification optical fiber, the wavelength $\lambda_p$, of said pumping light supplied from said pump light supply means existing in a short wavelength side only rather than a signal wavelength band; and multiplexing means for multiplexing said pumping light from said pumping light supply means with said signal light having propagated through said amplification optical fiber;

wherein at least a part of said light Raman-amplified by said pumping light having said wavelength $\lambda_p$ is utilized as pumping light so as to Raman-amplify signal light including a channel wavelength with a wavelength of ($\lambda_p+\Delta\lambda+20$ nm) or longer, where $\lambda\Delta$ is the Raman shift amount of said pumping light at said wavelength $\lambda_p$.

8. A Raman amplifier according to claim 7, wherein said wavelength $\lambda_p$ of said pumping light is set so as to be able to Raman-amplify at least first signal light including a signal channel within a first wavelength band located on a shorter wavelength side in an amplification wavelength band in which said signal light is Raman-amplified, and wherein second signal light including a signal channel within a second wavelength band located on a longer wavelength side than is said first wavelength band in said amplification wavelength band is Raman-amplified with said Raman-amplified first signal light being used as pumping light.

9. A Raman amplifier according to claim 7, wherein said pumping light supply means supplies, as said pumping light, a plurality of channels of pumping light having wavelengths different from each other to said amplification optical fiber.

10. A Raman amplifier according to claim 7, wherein said pumping light propagates in said amplification optical fiber in the same direction as a traveling direction of said signal light.

11. A Raman amplifier according to claim 7, wherein said pumping light propagates in said amplification optical fiber in a direction opposite from a traveling direction of said signal light.

12. A Raman amplifier according to claim 7, wherein said pumping light supply means supplies to said amplification optical fiber, as said pumping light, forward pumping light propagating in the same direction as a traveling direction of said signal light, and backward pumping light propagating in a direction opposite from said traveling direction of said signal light.

13. A Raman amplifier according to claim 7, wherein said amplification optical fiber includes a unitary optical fiber capable of Raman-amplifying said signal light.

14. An optical transmission system comprising:

an optical fiber transmission line through which a plurality of channels of signal light having wavelengths different from each other propagates; and a Raman amplifier according to claim 7, disposed at a predetermined position on said optical fiber transmission line, Raman-amplifying said signal light.

15. An optical transmission system according to claim 14, wherein said amplification optical fiber of said Raman amplifier includes an optical fiber provided separately from said optical fiber transmission line.

16. An optical transmission system according to claim 14, wherein said amplification optical fiber of said Raman amplifier constitutes a part of said optical fiber transmission line.

17. An optical transmission system comprising:

an optical fiber transmission line through which a plurality of channels of signal light having wavelengths different from each other propagates;

a first Raman amplifier having a structure identical to that of a Raman amplifier according to claim 7, said first Raman amplifier including an optical fiber as an amplification optical fiber provided separately from said optical fiber transmission line; and a second Raman amplifier having a structure identical to that of a Raman amplifier according to claim 7, said second Raman amplifier including an optical fiber as an amplification optical fiber constituting a part of said optical fiber transmission line.

18. An optical transmission system according to claim 14, wherein a predetermined channel in said plurality of channels of said signal light has a power higher than an input optical power to said optical fiber transmission line in a predetermined segment of said optical fiber transmission line.

19. An optical transmission system according to claim 14, wherein said plurality of channels of said signal light have the same input power to said optical fiber transmission line.

20. An optical transmission system according to claim 14, wherein, when no signal light propagates through said optical fiber transmission line in a channel used as pumping light in said plurality of channels of said signal light, dummy signal light having a wavelength coinciding with said channel wavelength is sent to said optical fiber transmission line.

21. An optical transmission system according to claim 14, wherein said plurality of channels of said signal light aie successively used in order of elongating wavelength.

22. A method according to claim 1, wherein said pumping light supply means supplies said pumping light in the same direction as the traveling direction of said signal light.

23. A Raman amplifier according to claim 7, wherein said pumping light supply means supplies said pumping light in the same direction as the traveling direction of said signal light.

* * * * *